(12) United States Patent
Hicks

(10) Patent No.: US 8,385,004 B2
(45) Date of Patent: Feb. 26, 2013

(54) ACCESSORY FOR PORTABLE IMAGING DEVICE

(75) Inventor: Adam Hicks, Somerville, MA (US)

(73) Assignee: Muses Consolidated, Somerville, MA (US)

( * ) Notice: Subject to any disclaimer, the term of this patent is extended or adjusted under 35 U.S.C. 154(b) by 0 days.

(21) Appl. No.: 13/479,113

(22) Filed: May 23, 2012

(65) Prior Publication Data

US 2013/0028591 A1  Jan. 31, 2013

Related U.S. Application Data

(60) Provisional application No. 61/574,135, filed on Jul. 28, 2011.

(51) Int. Cl.
*G02B 15/14* (2006.01)
*G03B 11/00* (2006.01)

(52) U.S. Cl. .................. 359/699; 396/544; D16/134

(58) Field of Classification Search .............. 359/699, 359/819–824, 694, 697, 319; 396/71, 422, 396/544, 89; D16/101, 134, 136, 200, 207, D16/219; 348/345
See application file for complete search history.

(56) References Cited

U.S. PATENT DOCUMENTS

| | | |
|---|---|---|
| 687,745 A | 12/1901 | Grover |
| 2,291,821 A | 8/1942 | McNabb |
| D154,911 S | 8/1949 | Dougherty |
| 3,815,970 A | 6/1974 | Murphy |
| 4,129,898 A | 12/1978 | Ohrstedt |
| 4,327,960 A | 5/1982 | Gould |
| 4,864,333 A | 9/1989 | Barber |
| 5,781,807 A * | 7/1998 | Glassgold et al. .............. 396/71 |
| 5,805,944 A | 9/1998 | Barclay et al. |
| 6,102,556 A | 8/2000 | Lieberman et al. |
| 6,307,686 B1 | 10/2001 | Ferraro |
| 6,351,617 B1 * | 2/2002 | Tam ............................ 396/332 |
| 6,889,006 B2 | 5/2005 | Kobayashi |
| 7,438,486 B2 | 10/2008 | Ho |
| 7,830,628 B2 * | 11/2010 | Schaefer ....................... 359/827 |
| 7,941,046 B2 | 5/2011 | Parnell |

(Continued)

FOREIGN PATENT DOCUMENTS

| | | |
|---|---|---|
| CA | 2230360 A1 | 2/1998 |
| GB | 2 409 050 A | 6/2005 |
| JP | 8095155 A | 4/1996 |
| JP | 2001066683 A | 3/2001 |

(Continued)

OTHER PUBLICATIONS

Spyder2021 "DIY Binocular Hack for Digital Camera" Instructables. com, May 28, http://www.instructables.com/id/DIY-Binocular-Hack-for-Digital-Camera/.

*Primary Examiner* — Dawayne A Pinkney
(74) *Attorney, Agent, or Firm* — Foley and Lardner LLP; John D. Lanza

(57) ABSTRACT

An apparatus for attachment to a portable image capture and storage device. The apparatus includes an auxiliary lens and an elastic band coupled thereto. The auxiliary lens is shaped for image alteration of an image obtained by the portable image capture and storage device. The auxiliary lens characterized by an optical axis extending from a base of the lens to a crown of the lens. The elastic band extends, at least in part, in a lateral direction, substantially orthogonal to the optical axis, from the auxiliary lens. The elastic band in combination with the auxiliary lens forms a closed loop whereby the apparatus is removably attachable to a peripheral portion of the image capture and storage device to alter the appearance of the image obtained by the portable image capture and storage device.

19 Claims, 11 Drawing Sheets

| U.S. PATENT DOCUMENTS | | | FOREIGN PATENT DOCUMENTS | | |
|---|---|---|---|---|---|
| 2003/0081947 A1 | 5/2003 | Mills | JP | 2005-278134 | 10/2005 |
| 2007/0196090 A1* | 8/2007 | Kubo ............................ 396/71 | JP | 2007078935 A | 3/2007 |
| 2007/0280677 A1 | 12/2007 | Drake et al. | WO | WO 9423338 | 10/1994 |
| 2009/0093274 A1 | 4/2009 | Yamamoto | WO | WO 2011/123861 | 10/2011 |
| 2011/0097069 A1 | 4/2011 | Braithwaite | | | |
| 2011/0170854 A1* | 7/2011 | Tse, Jr. ........................ 396/544 | * cited by examiner | | |

ACCESSORY FOR PORTABLE IMAGING DEVICE

CROSS REFERENCE TO RELATED APPLICATIONS

The present application claims priority to U.S. Provisional Application No. 61/574,135 filed Jul. 28, 2011, entitled "LENS ACCESSORY FOR PORTABLE IMAGING DEVICE," which application is incorporated herein by reference in its entirety.

TECHNICAL FIELD

Inventive embodiments disclosed herein relate to image capture and storage devices and more specifically to auxiliary apparatuses, such as lenses, for use with such devices.

BACKGROUND

Photography with low-end cameras and multiple-use devices with built-in cameras has become increasingly popular. However, these devices generally have fixed lenses with fixed focal lengths or a low range of focal lengths. Accordingly, such devices limit a user's ability to explore a wide range of image capture capabilities and techniques. Unlike some professional quality cameras, cameras integrated with multiple-use devices, such as mobile phones, and other non-professional grade cameras are generally not designed for integration with auxiliary components that expand the image capture capabilities of such devices. For example, professional grade cameras may incorporate lens mounting technology (such as a bayonet or thread mounting schemes) that allows auxiliary components, such as specialized lenses, to be mounted and dismounted to and from the camera body.

In an attempt to increase the range of image capture capabilities of non-professional grade cameras and cameras integrated into multiple-use devices, auxiliary components have been created for a limited number of these devices. However, these components generally have a number of significant disadvantages, some of which may be attributed to their attempt to integrate auxiliary components into a relatively new class of devices through methods and in manners akin to those implemented in existing professional grade devices. More specifically, current systems for integrating auxiliary components, particularly lenses, into multiple-use devices having built-in cameras, are generally complex, multi-component, bulky, expensive, and some times unstable devices that are cumbersome to integrate with the underlying device and lack device portability, characteristics which generally oppose the fundamental natures of the base devices.

SUMMARY

In view of the foregoing, the present disclosure describes inventive apparatuses, methods, and systems that allow an auxiliary component, such as an auxiliary lens to be quickly and easily integrated with a wide range of distinct devices, in an ultraportable, highly stable, low profile, and inexpensive form, thus allowing users to effectively and efficiently expand the range of their image capture devices substantially without regard to the model or configuration of the device and the quickly advancing upgrade opportunities.

In one exemplary inventive embodiments disclosed herein, an apparatus for attachment to a portable image capture and storage device is provided. The apparatus includes an auxiliary lens shaped for image alteration of an image obtained by the portable image capture and storage device. The auxiliary lens is characterized by an optical axis extending from a base of the lens to a crown of the lens. The apparatus also includes a single elastic band coupled to the auxiliary lens. The elastic band extends, at least in part, in a lateral direction, substantially orthogonal to the optical axis, from the auxiliary lens. The elastic band in combination with the auxiliary lens forms a closed loop whereby the apparatus may be removably attached to a peripheral portion of the image capture and storage device to alter the appearance of the image obtained by the portable image capture and storage device.

The elastic band of the apparatus may be conformably coupled to a peripheral portion of the auxiliary lens and the lens may have a circular periphery, in some inventive embodiments.

The auxiliary lens may be at least one of a fisheye lens, a macro lens, a wide angle lens, and a micro lens, in some inventive embodiments.

In some inventive embodiments, the image capture and storage device may be a mobile phone. The elastic band may be bonded to the auxiliary lens.

The elastic band may be bonded to the auxiliary lens by an adhesive, in some embodiments, and in other inventive embodiments, the elastic band may be welded to the auxiliary lens.

The elastic band of the apparatus may be composed of at least one of rubber, fibers, and fabric, in some inventive embodiments.

In some inventive embodiments, the elastic band completely encircles the auxiliary lens.

In some inventive embodiments, the elastic band is coupled to the auxiliary lens such that the base of the auxiliary lens is permitted to sit flush with a surface of the portable image capture and storage device.

The elastic band may include a flash aperture disposed adjacent to the auxiliary lens, the flash aperture permitting transmission of a flash of light through the elastic band, in some inventive embodiments.

The elastic band may have a width substantially equivalent to the diameter of the auxiliary lens, in various inventive embodiments.

In some inventive embodiments, the elastic band may be coupled to a plurality of lenses, and the plurality of lenses may include lenses having a plurality of shapes configured to provide a plurality of distinct image alteration capabilities.

The auxiliary lens may include a lens filter in some inventive embodiments and may include a lens frame, in some inventive embodiments.

Another exemplary inventive embodiment is provided herein. This inventive embodiment provides an apparatus for attachment to a portable image capture and storage device that includes an auxiliary lens and an elastic band coupled to the auxiliary lens and extending from a first peripheral portion of the auxiliary lens to a second peripheral portion of the auxiliary lens. The auxiliary lens is shaped for image alteration of an image obtained by the portable image capture and storage device and is characterized by an optical axis extending from a base of the lens to a crown of the lens. The elastic band in combination with the auxiliary lens forms a closed loop whereby the apparatus is removably attachable to a peripheral portion of the image capture and storage device to alter the appearance of the image obtained by the portable image capture and storage device. In this inventive embodiment, a first end of the elastic band may includes a first contour shaped to correspond to the first peripheral portion of the auxiliary lens and a second end of the elastic band includes a second contour shaped to correspond to the second peripheral portion of the auxiliary lens.

Another inventive embodiment provides a method of manufacturing an apparatus for attachment to a portable image capture and storage device. The method includes obtaining an auxiliary lens shaped for image alteration of an image obtained by the portable image capture and storage device. The auxiliary lens is characterized by an optical axis extending from a base of the lens to a crown of the lens. The method further includes severing a portion of the elastic band such that a first end of the elastic band and a second end of the elastic band include a contour shaped to correspond to a peripheral portion of the auxiliary lens. The method also includes bonding the first end of the elastic band and the second end of the elastic band to the peripheral portion of the auxiliary lens, such that the elastic band in combination with the auxiliary lens forms a closed loop whereby the apparatus is removably attachable to a peripheral portion of the image capture and storage device to alter the appearance of the image obtained by the portable image capture and storage device. In some inventive embodiments, the elastic band is severed by removal of a circular portion of the elastic band. The elastic band may form a complete loop prior to a portion thereof being severed and may be composed of rubber in various inventive embodiments.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
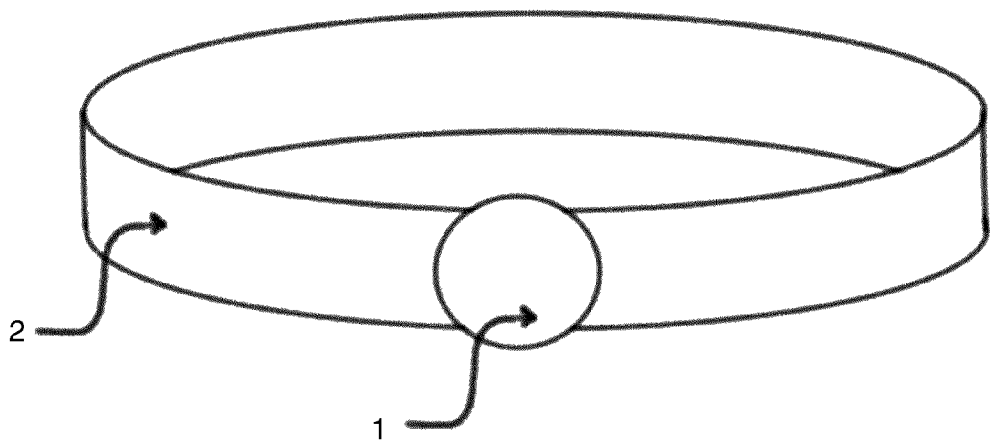
FIG. 1 is a perspective view of an auxiliary lens-band assembly consisting of a lens bonded to an elastic band.

The features and advantages of inventive embodiments disclosed herein will become more apparent from the detailed description set forth below when taken in conjunction with the drawings.

DETAILED DESCRIPTION

Following below are more detailed descriptions of various concepts related to, and embodiments of, inventive apparatuses, methods, and systems for attachment of an auxiliary component to a portable image capture and storage device. It should be appreciated that various concepts introduced above and discussed in greater detail below may be implemented in a variety of ways, as the disclosed concepts are not limited to any particular manner of implementation. Examples of specific embodiments, implementations, and applications are provided primarily for illustrative purposes.

Inventive embodiments provided herein relate to an auxiliary lens (e.g., a conversion lens or an optical filter) used for portable image capture and storage devices such as disposable and digital cameras and products with a built-in camera (e.g. cellular telephones and other electronic gadgets). More particularly, the inventive embodiments provide an interchangeable and detachable auxiliary lens comprising a conversion lens and a flexible band able to conform to various device shapes and sizes. Because camera devices, smart phones, and mobile phones with camera components are well known types of portable image capture and storage devices, exemplary inventive embodiments are disclosed demonstrating integration with such base devices.

An auxiliary lens includes a detachable prime fixed local length secondary lens, filter, or lens-filter combination, which may be coupled to a built-in lens of a camera, thereby changing the optical characteristic of the primary or built-in camera lens. The auxiliary lens may provide artistic accentuations to a photograph obtained by the camera through the concerted efforts of the primary lens and auxiliary lens.

As used in this specification, portable image capture and storage devices or cameras shall include, but are not limited to, disposable cameras, digital cameras, cellular telephones with built-in camera or other device with one or more built in-cameras, such devices having an objective lens for image formation; including the digital as well as the photographic film-based types. Furthermore, disposable cameras shall include other similar camera types such as single use cameras, recyclable cameras, use and mail camera, limited life inexpensive cameras and the like.

An auxiliary lens according to various inventive embodiments provides similar optical benefits as that of a general conversion lens (e.g. focal length, angle of View, etc.) and includes most all conversion lenses associated with the more sophisticated interchangeable lens types (e.g. telephoto lens, Wide-angle lens, and the like, including accompanying filter components) used with higher end cameras or professional quality cameras.

As demonstrated herein, inventive embodiments provide apparatuses and methods allowing an auxiliary lens to be quickly and easily attached and detached to and from a wide range of structurally different portable image capture and storage devices in a particularly stable, compact, and effective manner without the need for additional hardware or device specific components or structures.

Figure 1A:
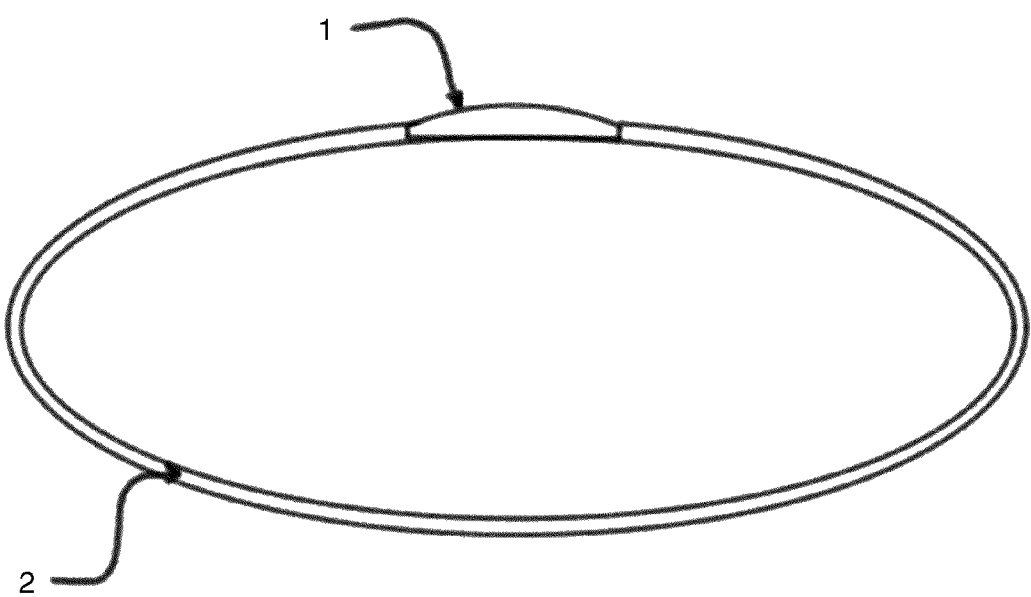
FIG. 1A is a top-down view of an auxiliary lens-band assembly consisting of a lens bonded to an elastic band.

In embodiment 100, depicted in FIG. 1, lens 1 is bonded directly to a flexible, elastic band 2. Band 2 may be composed of rubber, fiber, fabric, or other elastic materials. Band 2 may be bonded to lens 1 via an adhesive, chemical bonding, or via a weld or fusion process. The flexibility of the band 2 allows the band to conform to various shapes while the elasticity of the band 2 allows the device to fit securely on a wide range of differently sized devices. The choice of material of the band 2 affects the flexibility, elasticity, and the grip between the band 2 and the device to which it attaches. As demonstrated in FIG. 1, band 2 may be structured to conformably fit or contour to the shape of a peripheral portion of lens 100. This may be achieved in various inventive embodiments by providing a band with curved ends, for example during a separation or severing of a closed loop band for example via a circular punch. FIG. 1A depicts a top down view of the device shown in FIG. 1. FIG. 1 demonstrates how various embodiments may be implemented with a single elastic band. As shown in FIG. 1A, the substantially flush mounting of band 1 with the base of lens 1 allows the lens to rest against a surface of a base image capture device to which lens-band 100 is attached. As demonstrated in FIG. 1A, lens-band 100 provides a particularly low profile and allows an auxiliary lens to be integrated with a base image capture device, while adding, for example, simply a few millimeters to the thickness of such a device. Accordingly, the lens-band assembly is particularly unobtrusive and allows storage of the lens-band assembly with the device in substantially the same volume together as the device occupies without the lens-band assembly.

Figure 2:
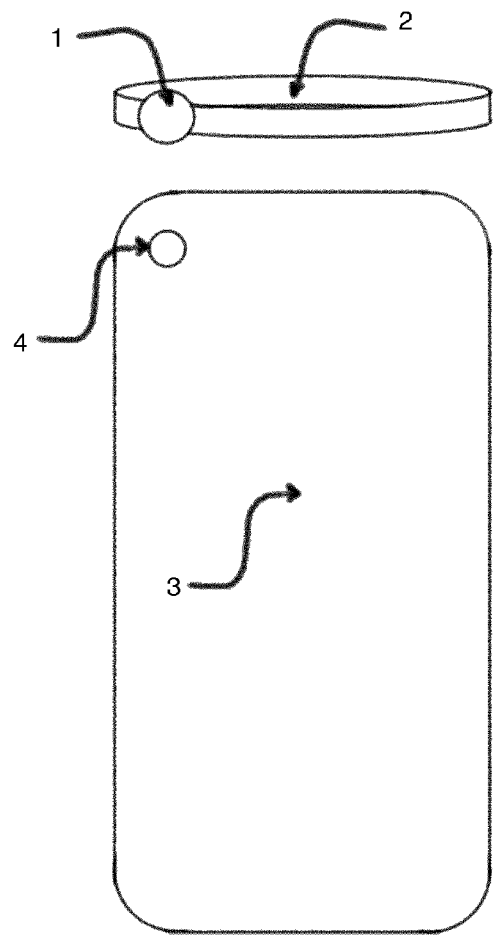
FIG. 2 is a front view of the auxiliary lens-band assembly of FIG. 1 displayed beside a smart phone.
Figure 2A:
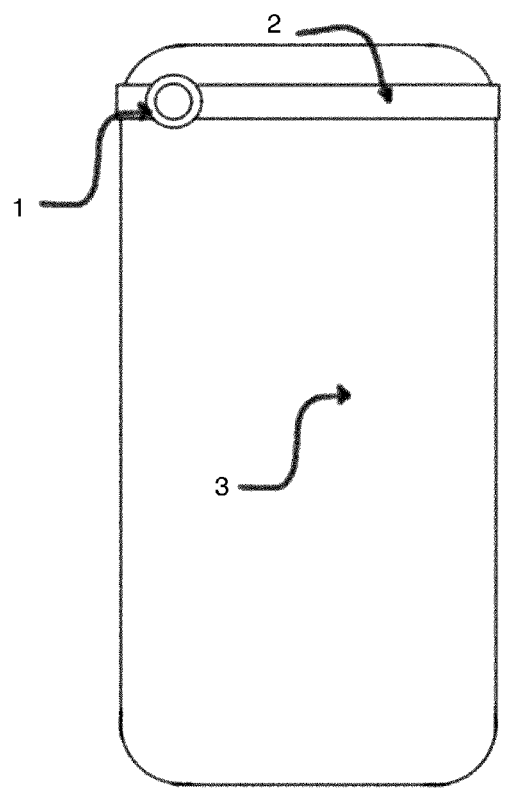
FIG. 2A is a front view of the auxiliary lens-band assembly of FIG. 1 installed on a smart phone.

FIGS. 2-5 depict lens-band 100 applied to a range of devices. FIG. 2 shows the lens-band assembly next to an exemplary smart phone device 3. The elastic band 2 of embodiment 100 allows the assembly to tightly conform to the size and shape of the device as demonstrated in FIG. 2A, thereby provided a secure and stable coupling to the device. The user is able to adjust the lens assembly's position on the device 3, a mobile phone device, to center the lens 1 over the built-in camera 4. The flexibility of the band allows for the lens 1 to be placed over the built-in camera 4 in virtually any location on the device 3. FIGS. 2 and 2A apply similarly to tablet computing devices with built-in cameras and other similarly-formed devices.

Figure 3:
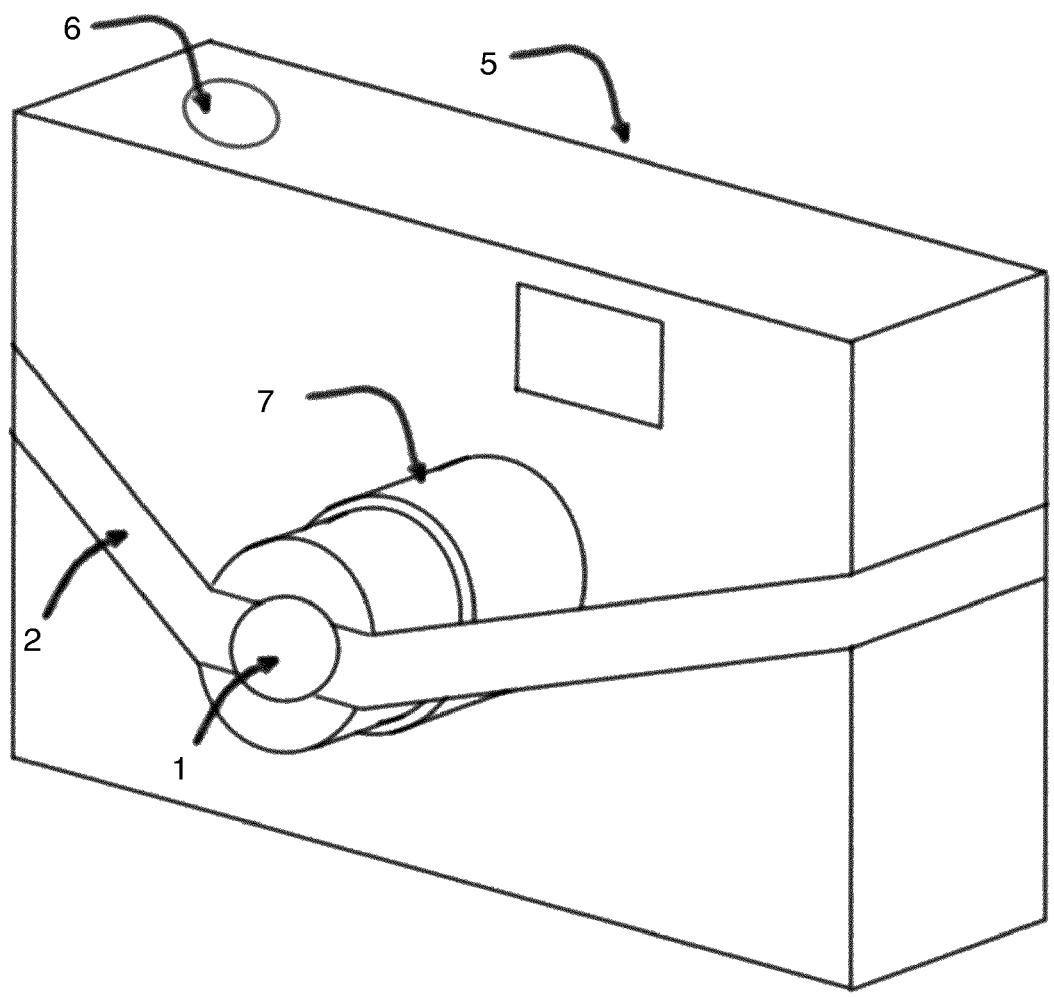
FIG. 3 is a perspective view of the auxiliary lens-band assembly of FIG. 1 installed on a compact camera.

FIG. 3 shows the lens assembly installed on a compact camera 5, such as a dedicated point and shoot camera. The shutter release button 6 is shown for perspective. The user may adjust the band 2 such that lens 1 is centered over the camera's telescoping lens 7. The elasticity of band 2 in lens-band 100 allows auxiliary lens 1 to remain firmly in place on telescoping lens 7 during an extension or retraction of lens 7 for zooming and focusing by the camera 5. Accordingly, lens-band assembly 100 can be used in conjunction with many functions of compact camera 5 and further enhance the range of optical capabilities of camera 5. The depicted implementation in FIG. 3 is similarly applicable to other types of compact cameras, such as fixed lens disposable cameras.

Figure 4:
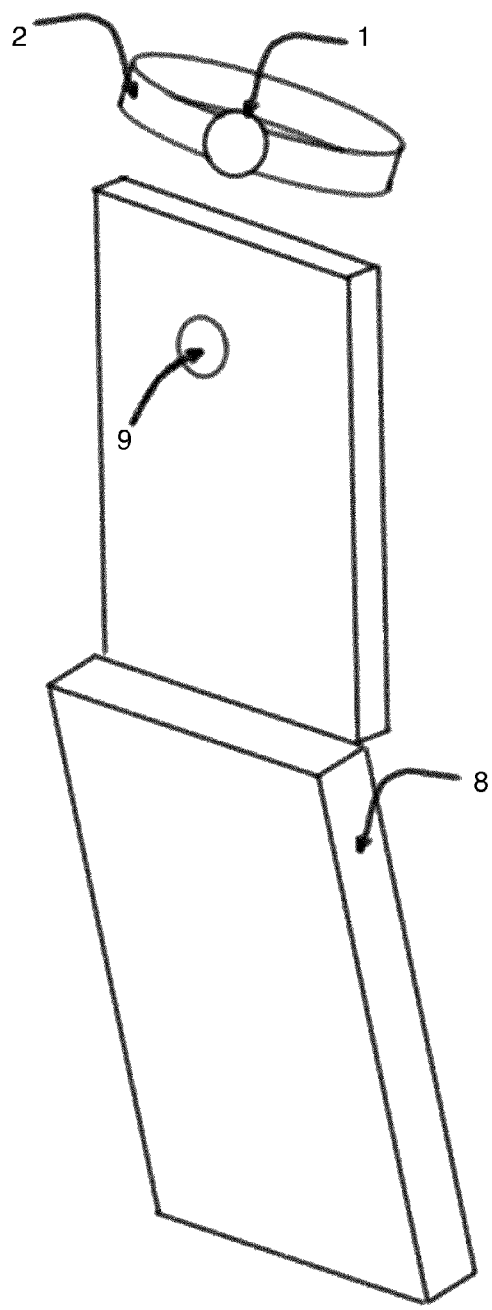
FIG. 4 is a perspective view of the auxiliary lens-band assembly of FIG. 1 displayed beside a flip-style phone.
Figure 4A:
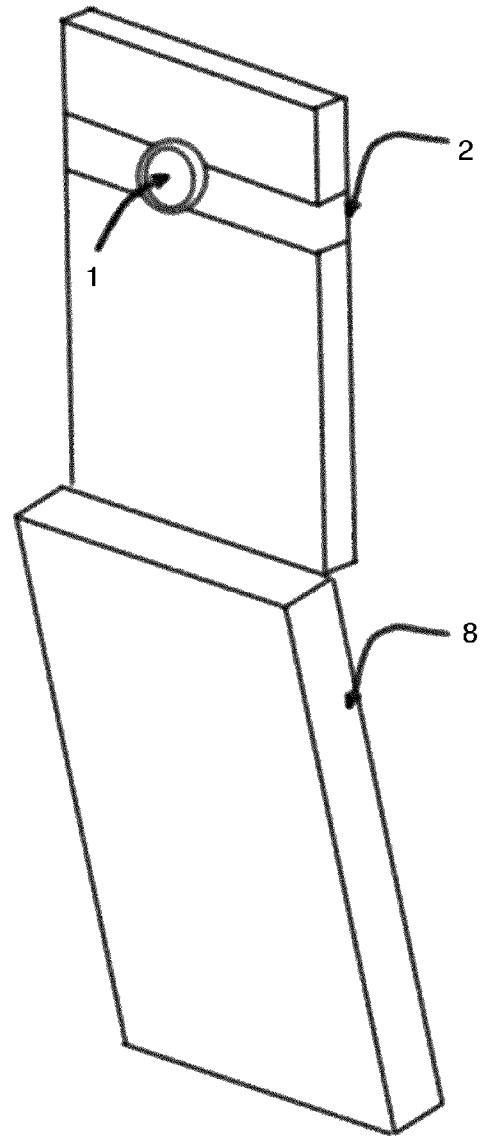
FIG. 4A is a perspective view of the auxiliary lens-band assembly of FIG. 1 installed on a flip-style phone.

FIGS. 4 and 4A depict the lens-band assembly 100 next to and installed on a flip-style phone 8, respectively. As in FIGS. 2 and 2A, the user may adjust band 2 such that auxiliary lens 1 is centered over built-in camera 9.

Figure 5:
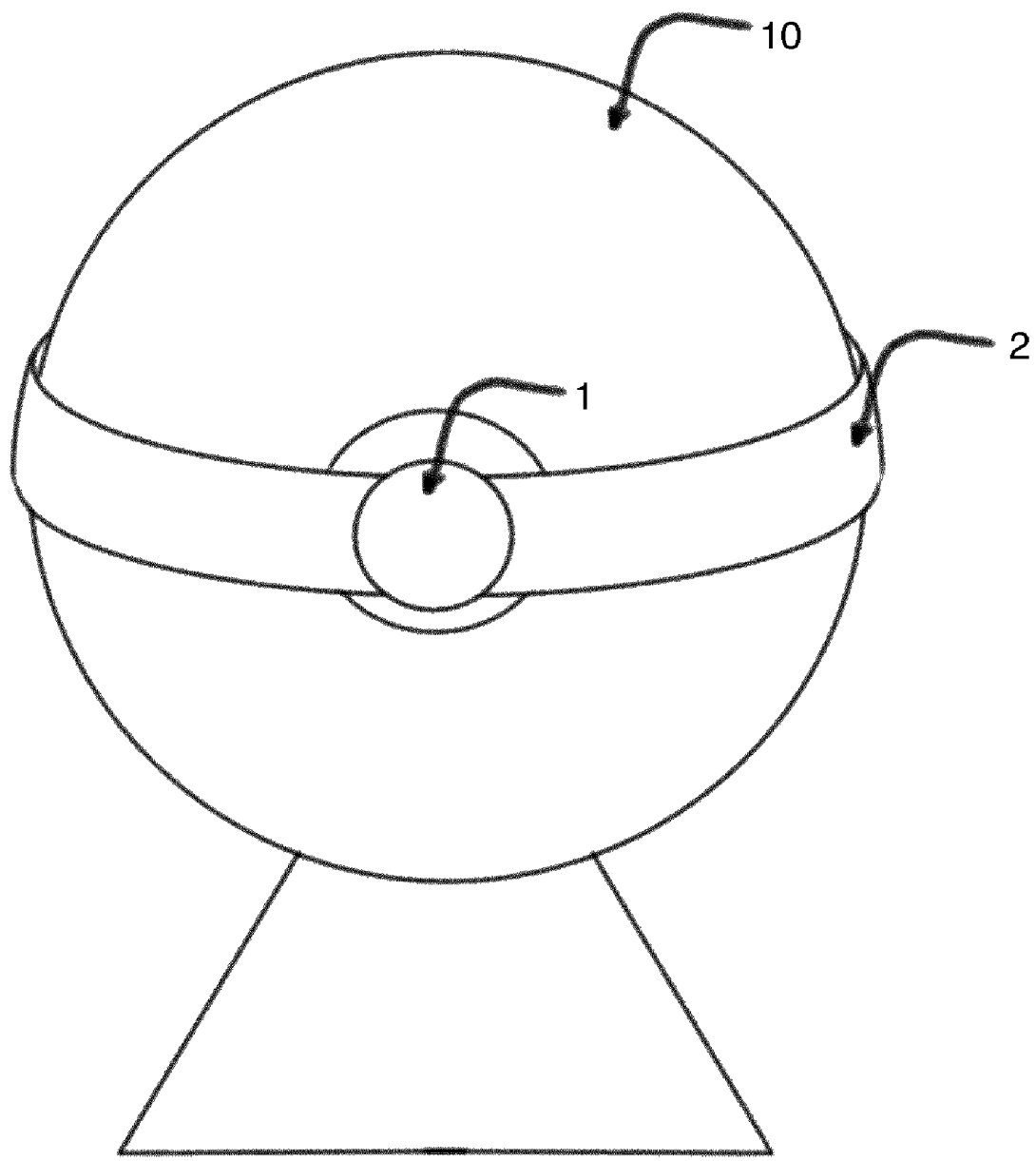
FIG. 5 is a front view of the auxiliary lens-band assembly of FIG. 1 installed on a webcam device.

FIG. 5 depicts lens-band assembly 100 installed on a webcam 10 for a desktop or portable computer. The flexibility and elasticity of the assembly allows for the use of the various lenses and filters on devices of widely-varying shapes and sizes.

Figure 6:
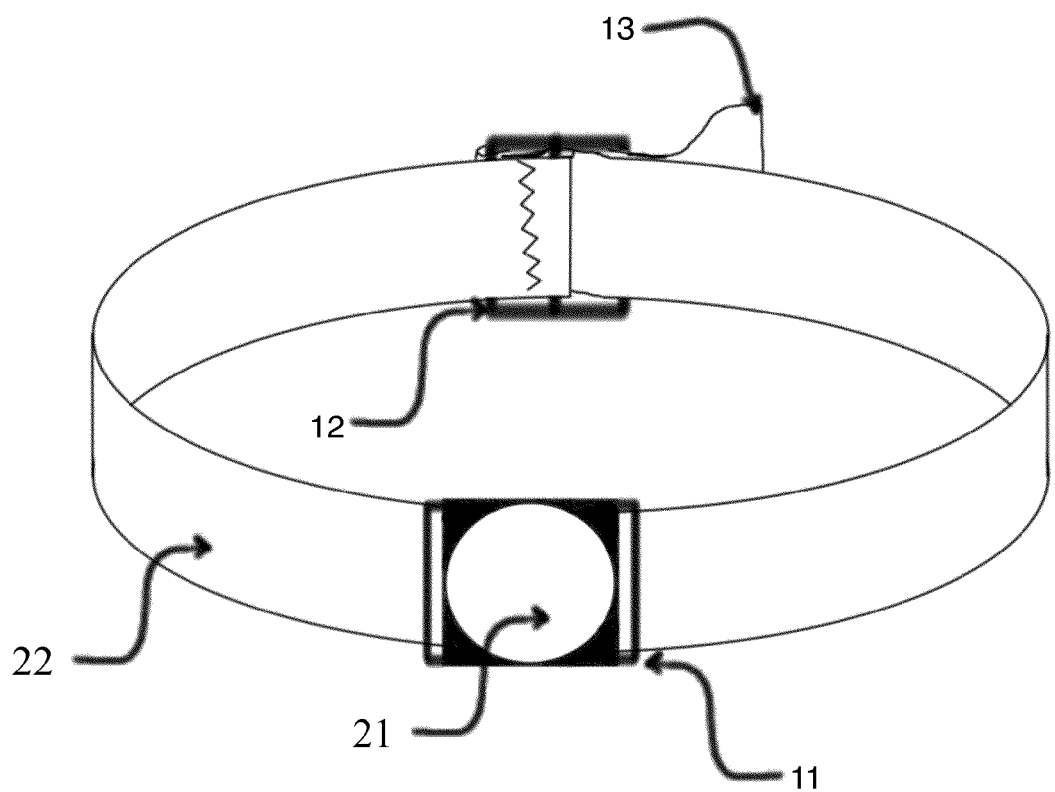
FIG. 6 illustrates a lens-band assembly that includes a band adjustable by means of a sliding buckle.

FIG. 6 depicts lens-band 200 having lens 21 held in a rigid frame 11, which is attached to the band 22. This embodiment allows for the use of a lens and a band composed of materials not readily bondable to one another, for example a glass lens and a rubber band. The rigid frame 11 may attach to the band by means of bonding or by looping the band through a feature on the frame and bonding or sewing the band on itself. The lens 21, which has a diameter that is substantially the same as the width of band 22, may be held in the rigid frame 11 by means of bonding or being seated in a recess designed to hold it in place. Embodiment 200 also depicts an adjustment feature that allows the use of a non-elastic band. The band 22 may be fixed on one end to a standard strap adjustment device 12. The other end of the band 13 loops through the adjustment device 12 allowing the user to adjust the assembly to fit securely over the portable imaging device that the assembly is being used with.

Figure 7:
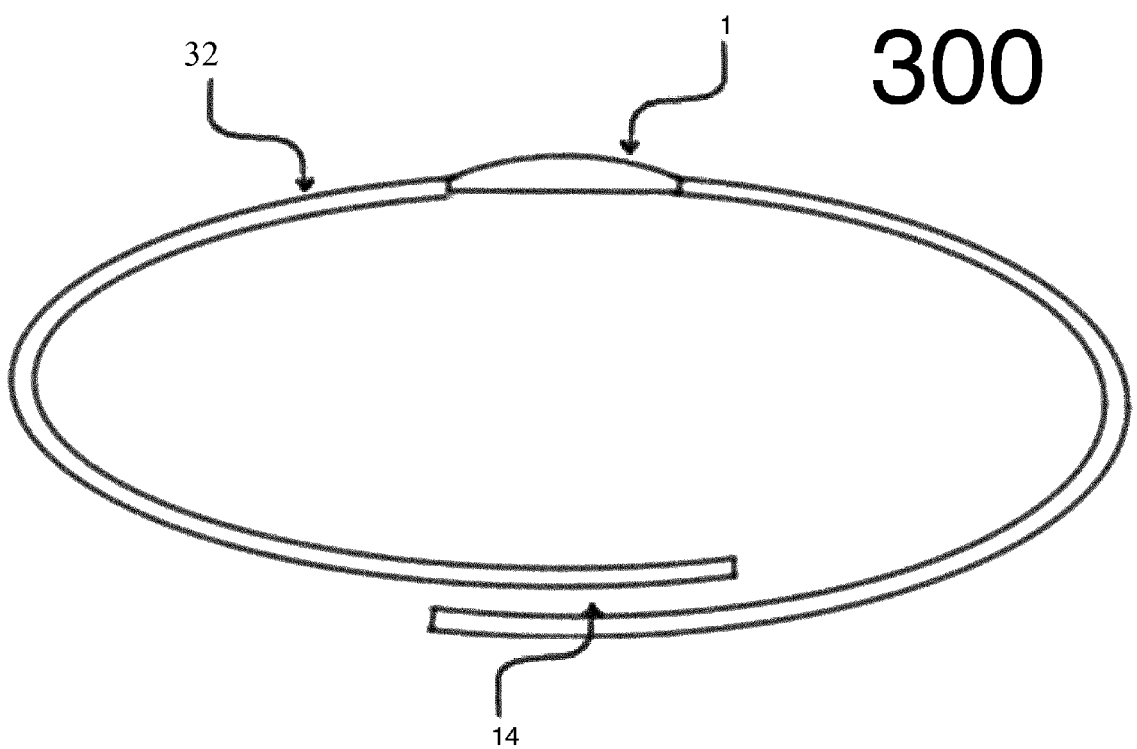
FIG. 7 illustrates a lens-band assembly including a band that is adjusted by a distinct fastener.

FIG. 7 depicts lens-band 300, which is similar to the arrangement provided by embodiment 100 except that the band 32 is an open loop band that may be closed and adjusted by means of hook and loop fastener 14, such as a Velcro fastener. This allows for adjustment beyond the limits of the elasticity of the band 2 itself.

Figure 8:
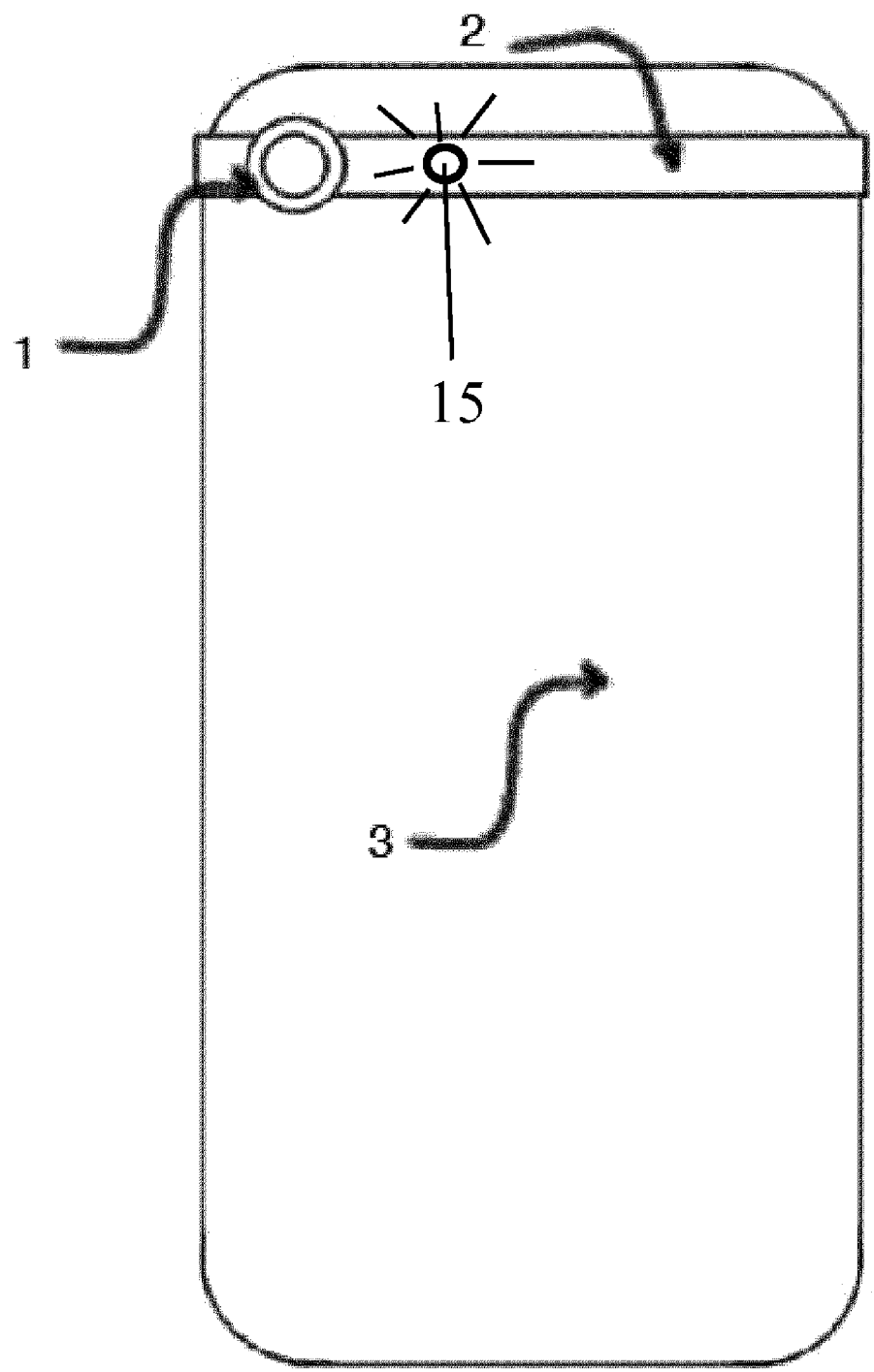
FIG. 8 illustrates an auxiliary lens-band assembly that includes a flash aperture.

FIG. 8 illustrates lens-band 100 with the additional feature of a flash aperture. A number of portable image capture devices, such as smart phone 3, may include a flash positioned adjacent to the lens aperture. Accordingly, lens-band 100 may be provided with an aperture 15 that permits the flash to be used when band 2 traverses the flash. While, aperture 15 is depicted as a circular aperture, the aperture may be elongated and may be provided in a variety of geometries to accommodate a range of distance between the flash and the lens aperture on device 3.

Figure 9:
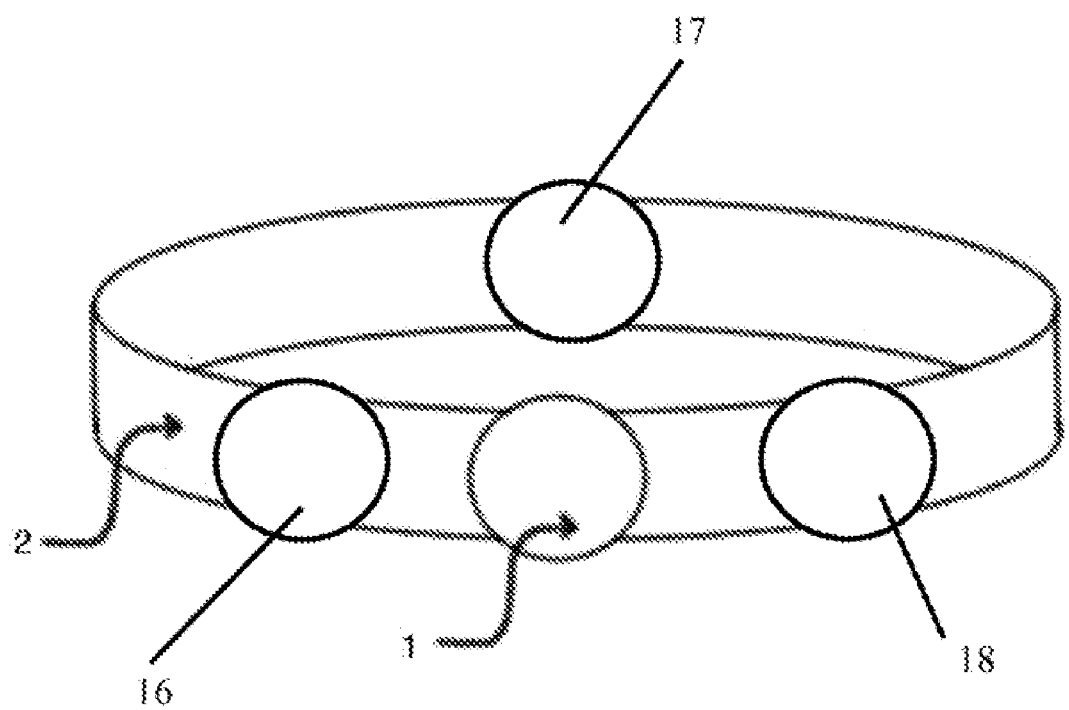
FIG. 9 shows an auxiliary lens-band assembly that includes a plurality of lenses.

FIG. 9 depicts lens-band 100 with a plurality of lenses. Lens 1, 16, 17, and 18 may all provide distinct optical characteristics. For example, lens 1, might be a macro lens, lens 16 might be a micro lens, lens 18 might be wide angle lens, and lens 17 might be a macro lens having a different level of magnification than lens 1 or a fish-eye lens. Alternatively, the lens may be provided in a variety of colors, depths, geometries (concave, convex, etc.). Accordingly, inventive embodiments of a lens-band may be provided such that one assembly allows a user to alter the image capture capabilities of an underlying device in a plurality of distinct ways.

Figure 10A:
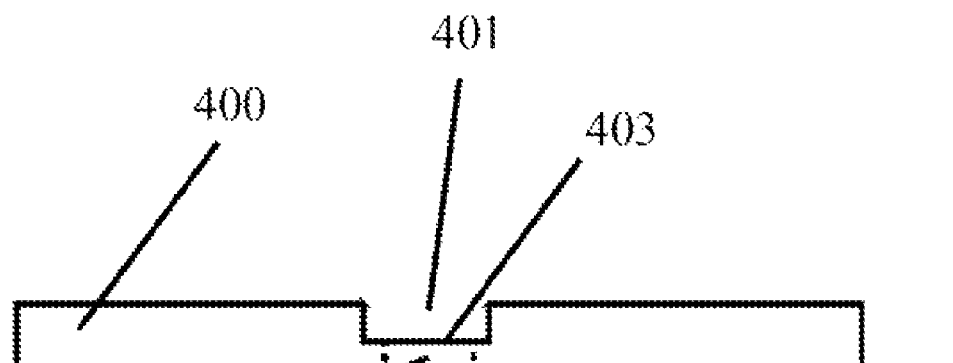
FIGS. 10A-10D illustrate an auxiliary lens-band assembly formed with a counter-bored geometry.
Figure 10B:
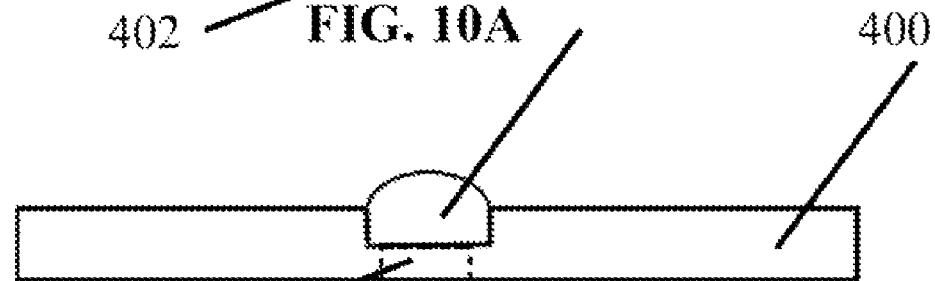
Figure 10C:
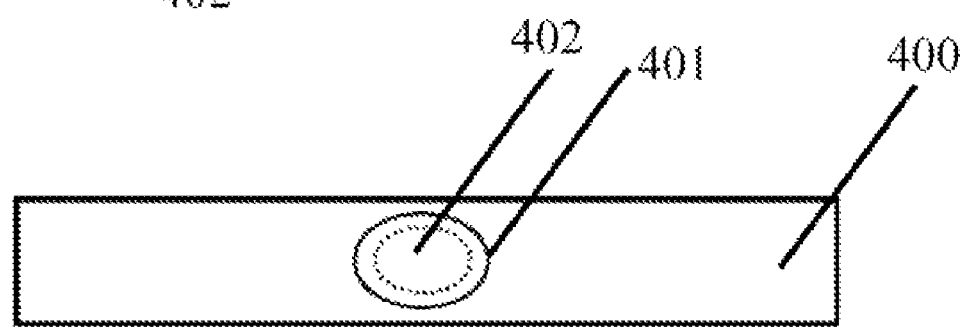
Figure 10D:
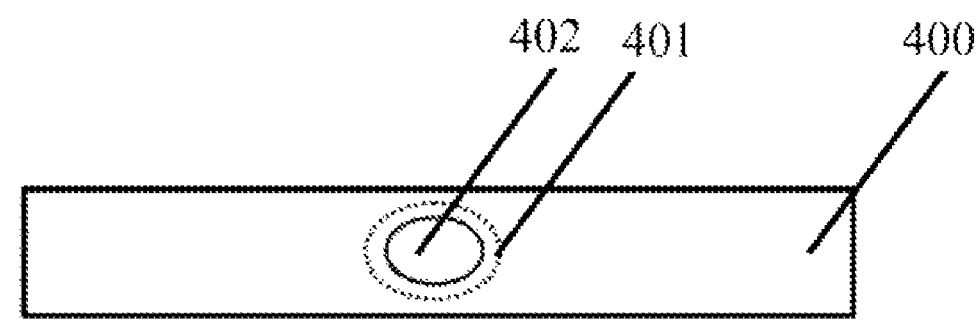
Figure 11:
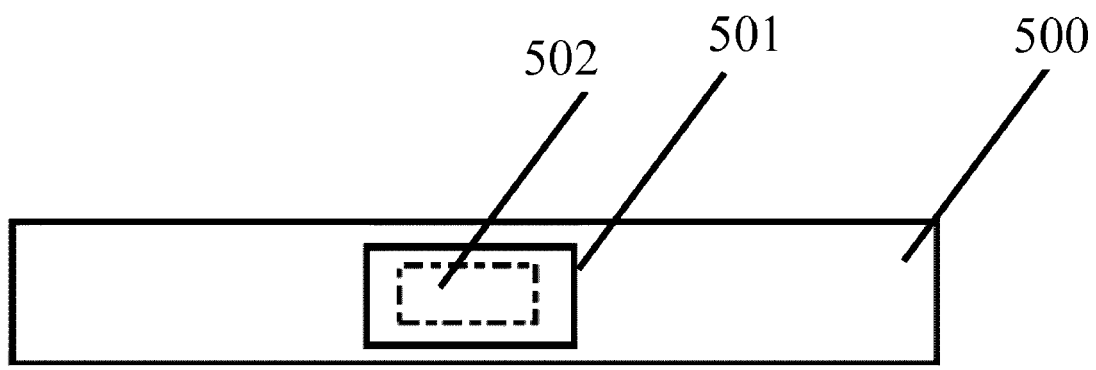
FIG. 11 illustrates an auxiliary lens-band with a rectangular counter-bored geometry.

FIGS. 10A-10D illustrate an auxiliary lens-band assembly formed with a counter-bored geometry. FIG. 10A shows the lens-band assembly 400 having the counter-bored geometry without the auxiliary lens coupled thereto. Accordingly, FIG. 10A shows the larger diameter of upper bore 401 with respect to lower bore 402. The difference in diameters of upper bore 401, which extends only partially through the depth of the elastic band and the diameter of the lower bore 402 causes the formation of ledge 403. Ledge 403 provides a support at the base of lens 410 shown in FIG. 10B. As FIG. 10B demonstrates, various embodiments may afford the elastic band to extend both from a peripheral portion of lens 410 as well as from the base of lens 410. The lens may also be bonded to the lens at one or more of these extension locations. FIG. 10C provides a top view of the lens-band assembly and demonstrates an embodiment where the band encircles lens 410 while FIG. 10D provides a bottom view of the lens-band assembly. In view of the smaller diameter of lower bore 402, a portion of lens 410 is not visible because of the elastic band. FIGS. 10C and 10D depict the counter-bored geometry as consisting of a circular geometry, but as demonstrated in FIG. 11, such geometry could be created with a rectangular counter bore geometry in lens-band assembly 500 having an upper rectangular bore 501 and a lower rectangular bore 502. The counter-bored geometry may also be created with other geometric shapes. Additionally, the counter-bored geometries allow the lens-ban assembly to be created without a complete severing of the elastic band, which may provide some assembly advantages.

In yet another inventive embodiment, a lens may be provided with a notch, channel, or groove formed in the periphery of the lens. The notch may be geometrically shaped to conform to a profile of a lens band attachable thereto. The lens band may include an aperture therein for receiving the notched lens. Accordingly, for assembly or manufacture of this embodiment of the lens band assembly, the lens band, and consequently the aperture in the lens band, may be stretched and the notched lens may be positioned in the aperture such that the notch in the lens receives the lens band. Such embodiments may be further secured through the use of an adhesive agent or through bonding as described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An apparatus for attachment to a portable image capture and storage device, the apparatus comprising:
    an auxiliary lens shaped to alter an image obtained by the portable image capture and storage device, the auxiliary lens characterized by an optical axis extending from a base of the lens to a crown of the lens; and
    an elastic band having a first end directly coupled to and extending from a first peripheral portion of the auxiliary lens, the elastic band extending from the first end of the elastic band to a second end of the elastic band, the second end of the elastic band directly coupled to and extending from a second peripheral portion of the auxiliary lens such that the auxiliary lens in combination with the elastic band coupled thereto form a closed loop, the auxiliary lens and the elastic band coupled such that the auxiliary lens is positioned in a plane of the elastic band, whereby the apparatus is removably attachable to a peripheral portion of the image capture and storage device to alter the appearance of the image obtained by the portable image capture and storage device.

2. The apparatus of claim 1, wherein the first end of the elastic band is conformably coupled to the first peripheral portion of the auxiliary lens and wherein the second end of the elastic band is conformably coupled to the second peripheral portion of the auxiliary lens.

3. The apparatus of claim 2 wherein the auxiliary lens has a circular periphery.

4. The apparatus of claim 1, wherein the auxiliary lens is at least one of a fisheye lens, a macro lens, a wide angle lens, and a micro lens.

5. The apparatus of claim 1, wherein the image capture and storage device is a mobile phone.

6. The apparatus of claim 1, wherein the first end of the elastic band is bonded to the first peripheral portion of the auxiliary lens and wherein the second end of the elastic band is bonded to the second peripheral portion of the auxiliary lens.

7. The apparatus of claim 6, wherein the first end of the elastic band and the second end of the elastic band are bonded to the auxiliary lens by an adhesive.

8. The apparatus of claim 1, wherein the first end of the elastic band is welded to the first peripheral portion of the auxiliary lens and wherein the second end of the elastic band is welded to the second peripheral portion of the auxiliary lens.

9. The apparatus of claim 1, wherein the elastic band is composed of at least one of rubber, fibers, and fabric.

10. The apparatus of claim 1, wherein the first end of the elastic band and the second end of the elastic band completely encircle the auxiliary lens.

11. The apparatus of claim 1, wherein the first end of the elastic band and the second end of the elastic band are coupled to the first peripheral portion of the auxiliary lens and the second peripheral portion of the auxiliary lens such that the base of the auxiliary lens is permitted to sit flush with a surface of the portable image capture and storage device.

12. The apparatus of claim 1, wherein the elastic band includes a flash aperture disposed adjacent to the auxiliary lens, the flash aperture permitting transmission of a flash of light through the elastic band.

13. The apparatus of claim 1, wherein the elastic band has a width substantially equivalent to the diameter of the auxiliary lens.

14. The apparatus of claim 1, wherein the auxiliary lens includes a lens filter.

15. The apparatus of claim 1, wherein the first end of the elastic band includes a first contour shaped to correspond to the first peripheral portion of the auxiliary lens and the second end of the elastic band includes a second contour shaped to correspond to the second peripheral portion of the auxiliary lens.

16. A method of manufacturing an apparatus for attachment to a portable image capture and storage device, the method comprising:

obtaining an auxiliary lens shaped for image alteration of an image obtained by the portable image capture and storage device, the auxiliary lens characterized by an optical axis extending from a base of the lens to a crown of the lens;

severing a portion of the elastic band such that a first end of the elastic band and a second end of the elastic band include a contour shaped to correspond to a first peripheral portion of the auxiliary lens and a second peripheral portion of the auxiliary lens;

bonding the first end of the elastic band directly to the first peripheral portion of auxiliary lens; and bonding the second end of the elastic band directly to the second peripheral portion of the auxiliary lens, the elastic band extending from the first peripheral portion of the auxiliary lens to the second peripheral portion of the auxiliary lens such that the auxiliary lens in combination with the elastic band coupled thereto form a closed loop, the auxiliary lens and the elastic band coupled such that the auxiliary lens is positioned in a plane of the elastic band, whereby the apparatus is removably attachable to a peripheral portion of the image capture and storage device to alter the appearance of the image obtained by the portable image capture and storage device.

17. The method of claim 16, wherein the elastic band is severed by removal of a circular portion of the elastic band.

18. The method of claim 16, wherein the elastic band forms a complete loop prior to a portion thereof being severed.

19. The method of claim 16, wherein the elastic band is composed of rubber.

* * * * *